United States Patent
Lippmeier

[11] Patent Number: 5,842,643
[45] Date of Patent: Dec. 1, 1998

[54] ARTICULATED EXHAUST NOZZLE FAIRING

[75] Inventor: William C. Lippmeier, Loveland, Ohio

[73] Assignee: General Electric Company, Cincinnati, Ohio

[21] Appl. No.: 758,326

[22] Filed: Dec. 3, 1996

[51] Int. Cl.⁶ ..................................................... B05B 12/00
[52] U.S. Cl. ..................................... 239/265.39; 244/52
[58] Field of Search ......................... 239/265.19, 265.33, 239/265.35, 265.7, 265.39; 244/23 D, 52, 219

[56] References Cited

U.S. PATENT DOCUMENTS

| | | | |
|---|---|---|---|
| 3,398,896 | 8/1968 | Rabone | 60/232 |
| 3,493,178 | 2/1970 | Bruner | 239/265.19 X |
| 4,128,208 | 12/1978 | Ryan et al. | 239/265 |
| 4,141,501 | 2/1979 | Nightingale | 239/265.39 |
| 4,392,615 | 7/1983 | Madden | 239/265 |
| 4,753,392 | 6/1988 | Thayer et al. | 239/265 |
| 4,848,664 | 7/1989 | Thayer | 239/265.35 X |
| 4,892,254 | 1/1990 | Schneider et al. | 239/265.33 X |
| 5,101,533 | 4/1992 | Stenger et al. | 16/340 |
| 5,201,800 | 4/1993 | Wolf | 239/265.19 X |
| 5,398,499 | 3/1995 | Urruela | 239/265.39 X |

OTHER PUBLICATIONS

General Electric Company, F110 Engine for F16 aircraft, see information disclosed on p. 1, paragraph 5 of the above "Information Disclosure Statement," to which this form PTO–1449 is an attachment.

*Primary Examiner*—Andres Kashnikow
*Assistant Examiner*—Stevens J. Ganey
*Attorney, Agent, or Firm*—Andrew C. Hess; David L. Narciso

[57] ABSTRACT

A variable area exhaust nozzle includes a divergent flap joined to an outer flap for allowing relative rotation and translation therebetween. An articulated fairing joins the aft ends of the divergent and outer flaps for providing aerodynamic streamlining. The fairing includes outer and inner shrouds, with the outer shroud being pivotally joined to the outer flap, and the inner shroud being fixedly joined to the divergent flap, and pivotally joined to the outer shroud for allowing relative rotation and translation therebetween.

10 Claims, 4 Drawing Sheets

ARTICULATED EXHAUST NOZZLE FAIRING

BACKGROUND OF THE INVENTION

The present invention relates generally to aircraft gas turbine engines, and, more specifically, to an augmented bypass turbofan engine having a variable area exhaust nozzle.

High performance military aircraft typically include a bypass turbofan gas turbine engine having an augmenter or afterburner for providing additional thrust when desired, with the exhaust flow being discharged through a variable area converging-diverging (CD) exhaust nozzle. During dry operation when the augmenter is not fueled, the exhaust nozzle is placed in a closed position having a minimum discharge flow area for the exhaust flow therethrough. In wet operation when the augmenter is fueled for producing additional thrust from the engine, the nozzle is positioned in an open position having maximum discharge flow area.

A typical CD nozzle includes a plurality of circumferentially adjoining primary flaps pivotally joined at forward ends to a structural exhaust casing. A plurality of secondary or divergent flaps are pivotally joined to aft ends of respective primary flaps. And a plurality of compression links are pivotally joined at opposite ends to the exhaust casing and to respective ones of the divergent flaps for creating four-bar linkages which control kinematic motion of the flaps between the open and closed positions of the nozzle. In the nozzle closed position during dry operation, the primary flaps converge to a throat of minimum flow area, with the divergent flaps diverging for increasing flow area in the aft direction for maximizing aerodynamic performance of the exhaust flow at supersonic Mach velocity.

The exhaust nozzle typically projects outwardly from the aft end of an aircraft in which it is mounted, and therefore ambient air flows around the exhaust nozzle and meets the exhaust flow discharged therefrom. In order to reduce aerodynamic pressure losses during aircraft flight, the exhaust nozzle also includes a plurality of circumferentially adjoining outer flaps joined at opposite ends to the exhaust casing and the aft ends of the divergent flaps. Since the four-bar linkages control kinematic motion, the outer flaps must be suitably attached to the divergent flaps without restraining the free motion thereof. This is accomplished by providing a compound pivoting and translating joint between the aft ends of the cooperating divergent and outer flaps. These compound joints allow relative rotation between the divergent and outer flaps as well as relative axial translation therebetween as the nozzle is adjusted between its open and closed positions.

An example of an exemplary CD exhaust nozzle and a compound joint therein is disclosed in U.S. Pat. No. 5,109,533-Stenger et al, assigned to the present assignee.

However, the compound joint joining the aft ends of the divergent and outer flaps in this exemplary exhaust nozzle effect a blunt nozzle trailing edge which creates a wake or stagnation region therebehind during operation. Since ambient air flows rearwardly over the outer flaps, and exhaust gases flow rearwardly inside the divergent flaps, the two flow streams mix at the blunt nozzle trailing edge and experience aerodynamic pressure losses.

Accordingly, it is desired to reduce the aerodynamic mixing losses at the blunt trailing edge of a CD exhaust nozzle of this type without restraining kinematic motion thereof.

SUMMARY OF THE INVENTION

A variable area exhaust nozzle includes a divergent flap joined to an outer flap for allowing relative rotation and translation therebetween. An articulated fairing joins the aft ends of the divergent and outer flaps for providing aerodynamic streamlining. The fairing includes outer and inner shrouds, with the outer shroud being pivotally joined to the outer flap, and the inner shroud being fixedly joined to the divergent flap, and pivotally joined to the outer shroud for allowing relative rotation and translation therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
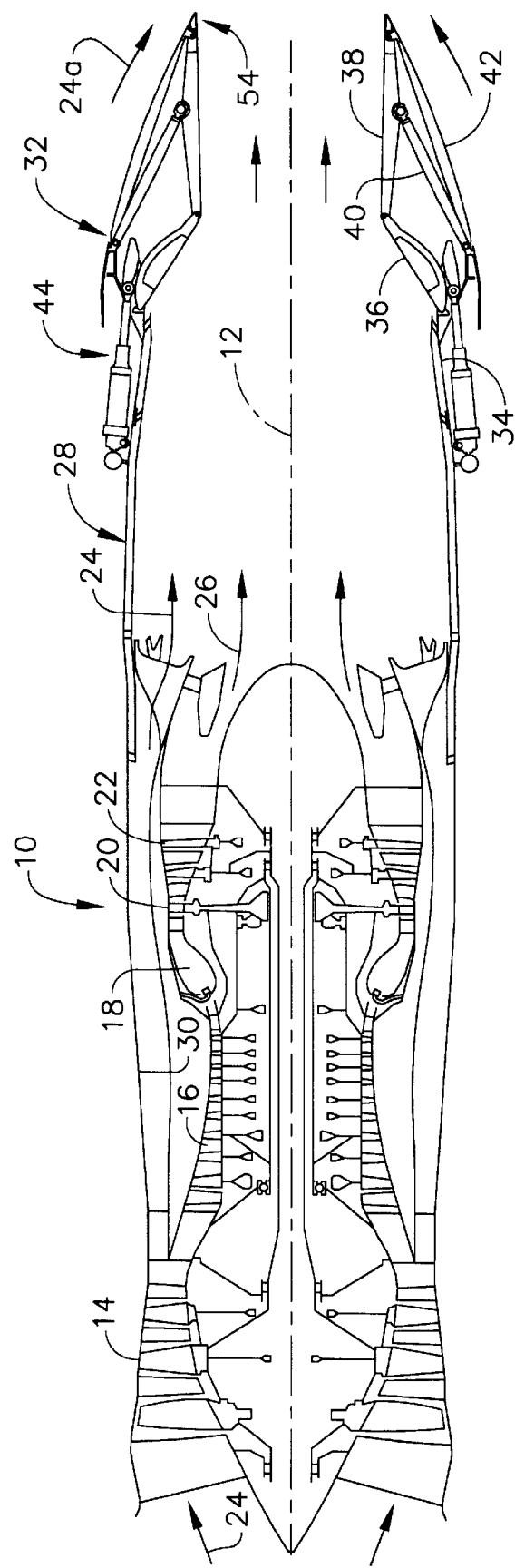
FIG. 1 is an axial sectional view through an exemplary aircraft turbofan gas turbine engine having an augmenter, and a variable area exhaust nozzle in accordance with one embodiment of the present invention.

Illustrated in FIG. 1 is an exemplary medium bypass ratio turbofan gas turbine engine 10 for powering an aircraft (not shown) in flight. The engine 10 includes in serial flow communication about a longitudinal or axial centerline axis 12 a multistage fan 14, a multistage axial compressor 16, an annular combustor 18, a single stage high pressure turbine 20 suitably joined to the compressor 16 by a drive shaft, and a multistage low pressure turbine 22 suitably joined to the fan 14 by a drive shaft.

The engine 10 is conventional in configuration and operation and receives air 24 which is initially compressed in the fan 14, with a portion being channeled through the compressor 16 and suitably mixed with fuel in the combustor 18 and ignited for generating hot combustion gases which are channeled in turn through the turbines 20, 22 which extract energy therefrom, with the combustion gases being discharged therefrom as exhaust flow 26 into a conventional afterburner or augmenter 28. A portion of the fan air 24 bypasses the core engine and flows through an annular bypass duct 30 for effecting medium bypass operation of the engine 10, with the bypass fan air 24 being suitably discharged into the augmenter 28 wherein it is mixed with the exhaust flow 26 and discharged through a variable area exhaust nozzle 32.

The augmenter 28 may take any conventional form and includes suitable flameholders and fuel injection spraybars for effecting augmented operation to increase thrust when desired. In dry, unfueled operation, the exhaust flow 26 is simply discharged through the exhaust nozzle 32, with a suitable minimum discharge flow area thereof. During wet, fueled operation, fuel is added to the bypass and exhaust flows and ignited for generating additional thrust, and discharged through the exhaust nozzle 32 in an open position having maximum discharge flow area for accommodating the additionally expanded exhaust flow 26.

Figure 2:
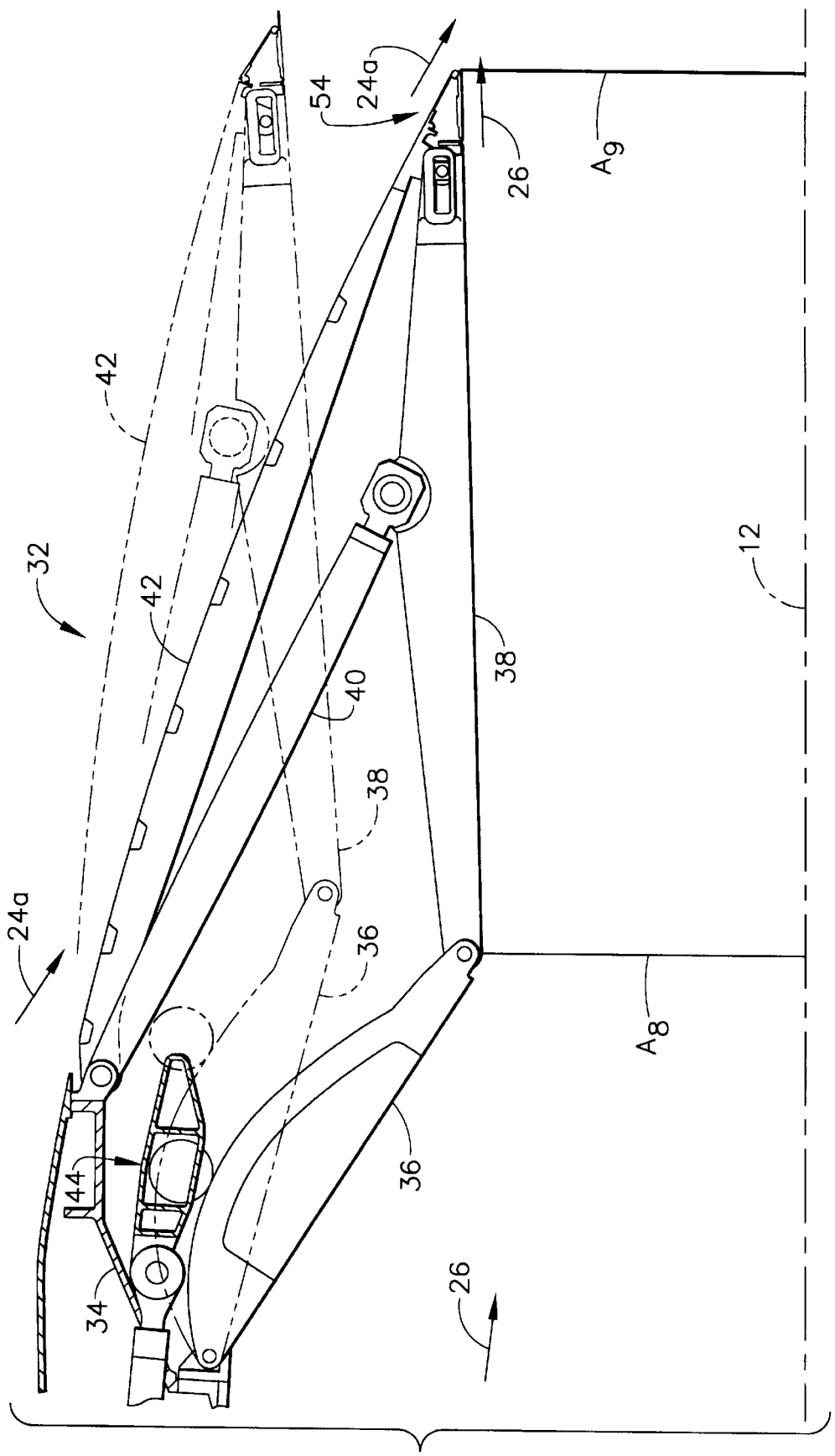
FIG. 2 is an enlarged, partly sectional view through a portion of the exhaust nozzle illustrated in FIG. 1 illustrating primary and divergent flaps joined together with a compression link in a four-bar linkage, and with an outer flap pivotally joined to the aft end of the divergent flap, and with a trailing edge fairing in accordance with an exemplary embodiment of the present invention.

The exhaust nozzle 32 is illustrated in more particularity in FIG. 2 and includes an annular structural exhaust casing 34, which also extends forwardly as part of the augmenter 28. A plurality of circumferentially spaced apart primary flaps 36 are pivotally joined at forward ends to the exhaust casing 34. A plurality of circumferentially spaced apart secondary or divergent flaps 38 are pivotally joined at forward ends thereof to respective aft ends of the primary flaps 36.

A plurality of compression links 40 are pivotally joined at opposite ends to the exhaust casing 34 and respective ones of the divergent flaps 38 at axially intermediate positions therein to define respective four-bar linkages to control kinematic motion of the primary and divergent flaps 36, 38 and effect the converging-diverging (CD) nozzle 32 having variable flow area ranging between open and closed positions thereof corresponding with maximum and minimum discharge flow area. The nozzle closed position is illustrated in solid line in FIG. 2, and its open position is illustrated in phantom.

Since the exhaust nozzle 32 projects outwardly from the aircraft (not shown) in which it is mounted in operation, it is subject to flow thereover of ambient air 24a. Accordingly, the nozzle 32 further includes a plurality of circumferentially spaced apart outer flaps 42 which are pivotally joined at opposite ends to the exhaust casing 34 and respective ones of the divergent flaps 38 at their aft ends. The outer flaps 42 provide an aerodynamic shroud or fairing over which the ambient air 24a may flow for reducing drag during flight.

As shown in FIGS. 1 and 2, suitable means 44 are provided for actuating the primary flaps 36 between the nozzle open and closed positions, and in turn varying the flow area of the divergent flaps 38. The exhaust nozzle 32 including the actuating means 44, may take any conventional form including that disclosed in U.S. Pat. No. 5,101,533- Stenger et al, and incorporated herein by reference. In this embodiment, the actuating means 44 include a plurality of linear hydraulic actuators which axially translate an actuation ring disposed between the primary flaps 36 and the compression links 40. The actuation ring includes rollers configured for engaging the backsides of the primary flaps 36 during operation. The pressure of the exhaust flow 26 urges the primary flaps 36 radially outwardly, with the axial position of the actuation ring controlling the angular position of the primary flaps 36. The divergent flaps 38 follow in turn the pivoting movement of the primary flaps 36 as controlled by the four-bar linkages.

As shown in FIG. 2, the juncture of the primary and divergent flaps 36, 38 defines a throat having a flow area designated $A_8$. The throat flow area is minimum during dry operation with the nozzle 32 in its relatively closed position, and has a maximum value in augmented, wet operation with the nozzle 32 being positioned in its relatively open position.

Figure 3:
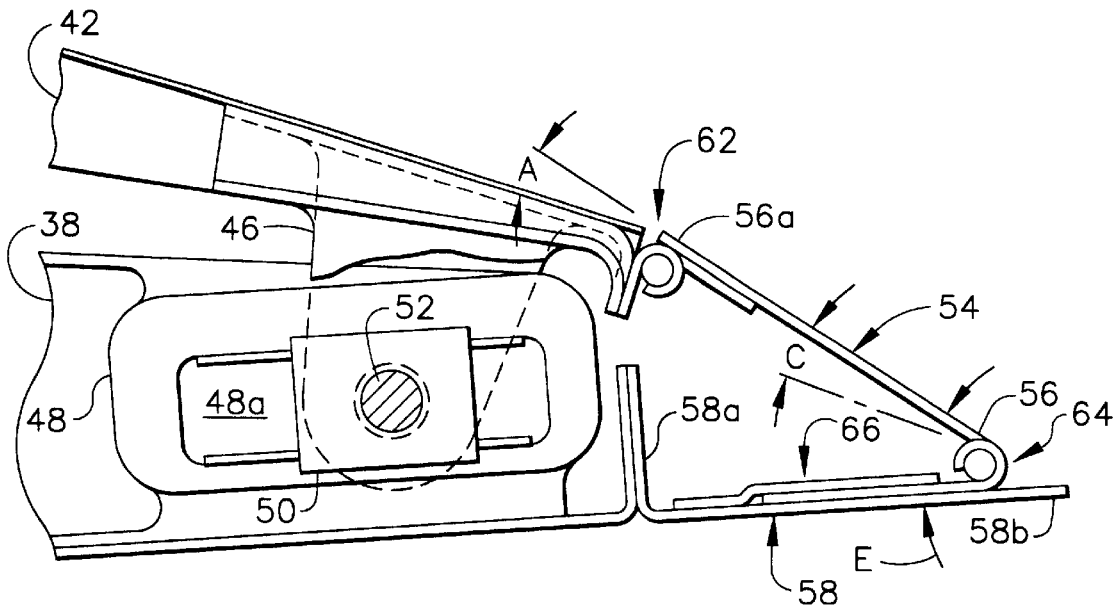
FIG. 3 is an enlarged axial view of the trailing edge fairing joined to the diverging and outer flaps in accordance with an exemplary embodiment of the present invention, with the nozzle being disposed in an open position, as additionally shown in phantom in FIG. 2.
Figure 4:
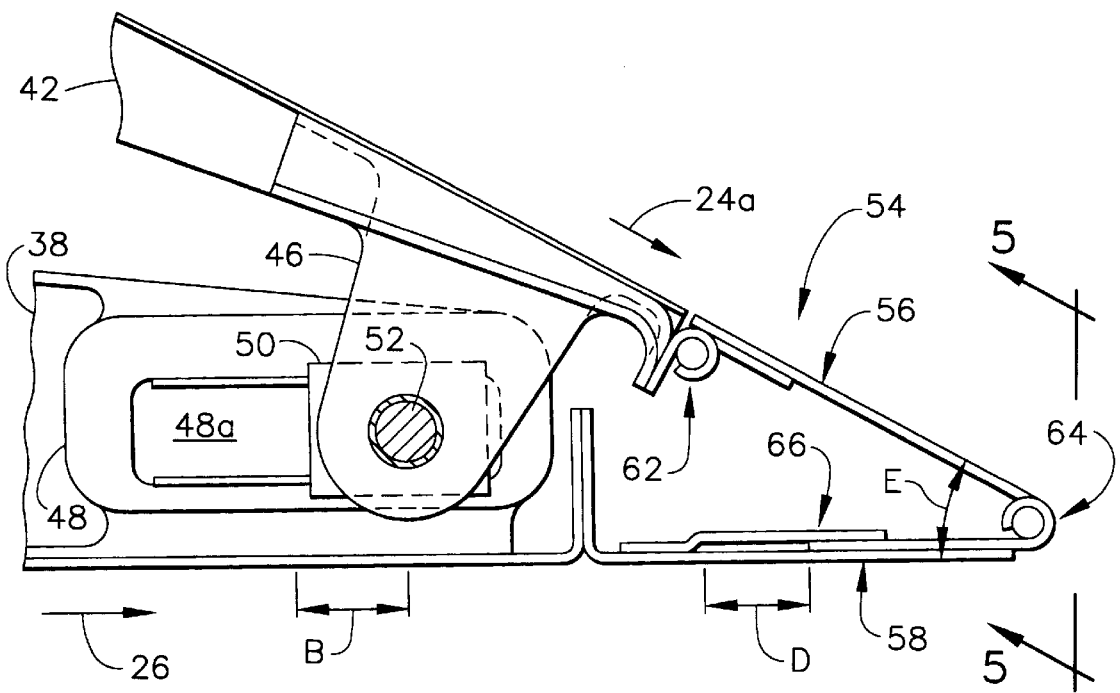
FIG. 4 is an enlarged axial view of the trailing edge fairing joined to the diverging and outer flaps in accordance with an exemplary embodiment of the present invention, with the nozzle being disposed in an closed position, as additionally shown in solid line in FIG. 2.

The aft ends of exemplary ones of the divergent and outer flaps 38, 42 are illustrated in more particularity in FIGS. 3 and 4 in the open and closed positions of the nozzle, respectively. In order to permit unrestrained movement of the divergent flaps 38 during variable area operation, the aft end of each outer flap 42 includes a clevis bracket 46 which straddles a radial lug 48 extending upwardly from a corresponding one of the divergent flaps 38. The lug 48 includes an axial slot 48a therein which receives a sliding block 50. A bolt 52 extends laterally through the clevis 46, sliding block 50, and lug 48 for defining the compound aft joint between each of the divergent and outer flaps 38, 42.

As the divergent flap 38 moves between the open and closed positions of the exhaust nozzle, corresponding outer flaps 42 pivot and translate relative thereto as shown in FIGS. 3 and 4 over a pivoting angular range designated A, and an axial translation range designated B. The bolt 52 allows the relative pivoting between the aft ends of the divergent and outer flaps 38, 42, and the sliding block 50 travels axially within the lug slot 48a for accommodating the relative translation B therebetween.

As indicated above, this design of the nozzle 32 is conventional in configuration and operation but provides a relatively blunt trailing edge which increases drag during operation as the ambient air 24a flows downstream over the outer flaps 42, and the exhaust flow is discharged along the divergent flaps 38.

In accordance with the present invention, a plurality of trailing edge fairings 54 are joined to respective pairs of the divergent and outer flaps 38, 42 for aerodynamically streamlining the aft end of the exhaust nozzle 32 and covering the undesirable blunt region for reducing overall drag of the exhaust nozzle during flight operation.

Figure 5:
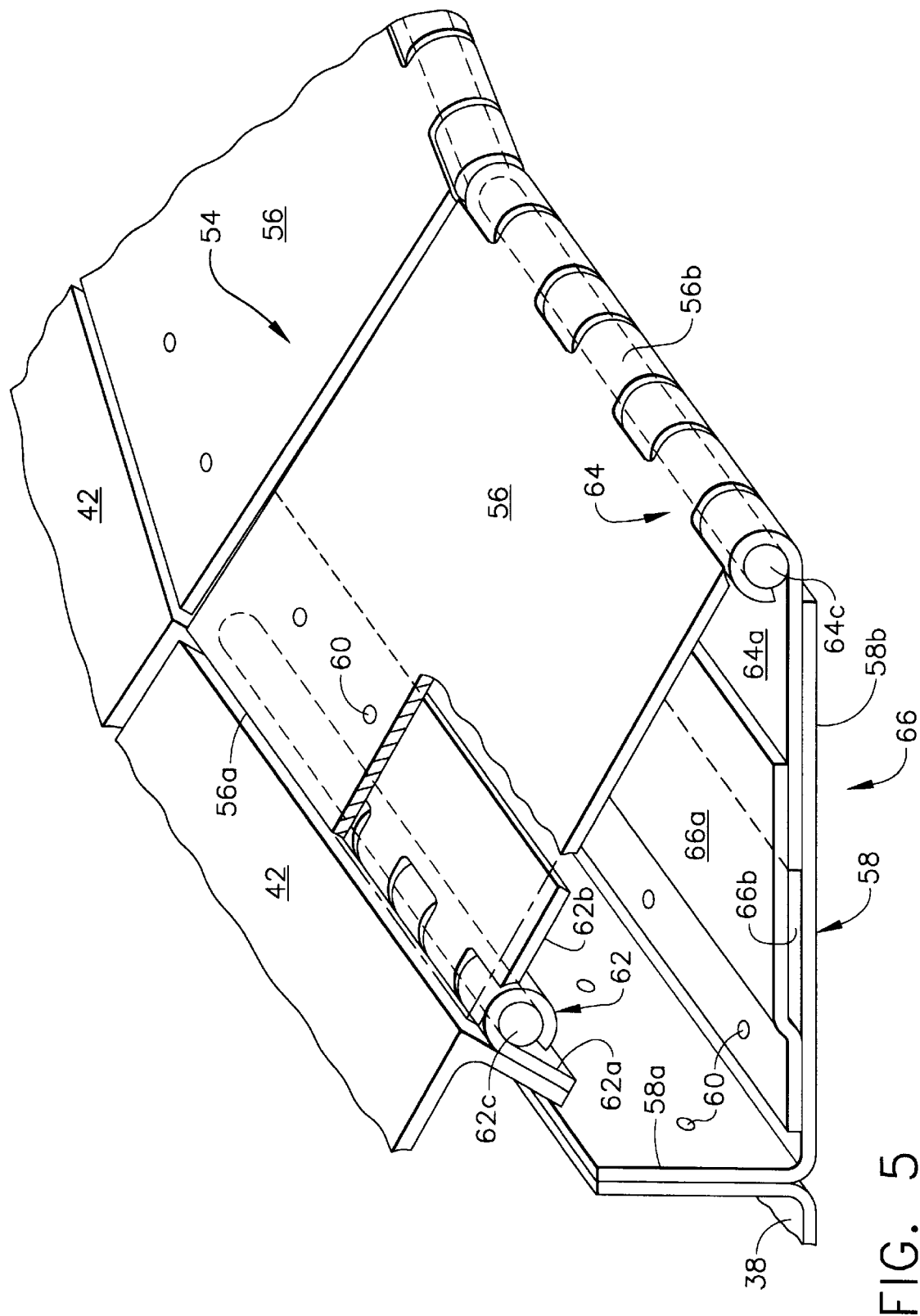
FIG. 5 is a partly sectional aft-facing-forward isometric view of the exemplary trailing edge fairing illustrated in FIG. 4 and taken generally along line 5—5.

As shown in more particularity in FIGS. 3–5, each trailing edge fairing 54 includes a first or radially outer shroud 56 having forward and aft ends 56a,b. Each fairing 54 also includes a second or radially inner shroud 58 having forward and aft ends 58a,b.

As shown in more particularity in FIG. 5, the inner shroud forward end 58a is configured in the form of a radial flange which is fixedly joined to a corresponding radial flange at the aft end of the divergent flap 38, by being spot welded thereto, for example, at a plurality of spot welds 60.

Since the divergent and outer flaps 38, 42 experience relative rotation and translation as the nozzle 32 is adjusted between the open and closed positions, the outer and inner shrouds 56, 58 must also accommodate relative rotation and translation for maintaining a suitably streamlined outer profile. In the exemplary embodiment illustrated in FIG. 5, outer joining means in the exemplary form of a first hinge 62 are provided for pivotally joining the outer shroud 56 to the aft end of the corresponding outer flap 42. And, inner joining means are provided for joining the outer shroud 56 to the inner shroud 58 for allowing relative rotation over an angular range designated C, as illustrated in FIG. 3, and relative axial translation designated D, as illustrated in FIG. 4, between the outer and inner shrouds 56, 58 as the nozzle is adjusted between its open and closed positions.

In this way, the outer and inner shrouds 56, 58 are articulated relative to each other and relative to the divergent and outer flaps 38, 42 for maintaining a streamlined trailing edge of the nozzle 32 without restraining kinematic motion between the divergent and outer flaps 38, 42. In the exemplary embodiment illustrated in FIG. 5, the first hinge 62 includes first and second interdigitated leafs 62a,b and a joining first hinge pin 62c extending through tubular ends thereof. The first leaf 62a is fixedly joined to a corresponding radial flange at the aft end of the outer flap 42, such as by spot welding thereto. And, the second leaf 62b is fixedly joined below the forward end 56a of the outer shroud 56, again by suitable spot welds 60, for example. The first hinge 62 is therefore a separate component which pivotally joins the outer shroud 56 to its respective outer flap 42 for allowing relative pivoting movement therebetween.

FIG. 5 also illustrates an exemplary embodiment of the inner joining means which include a second hinge 64 disposed at the aft end 56b of the outer shroud 56 for allowing relative rotation between the outer and inner shrouds 56, 58. The inner joining means also include an axial slip joint 66 joining the second hinge 64 to the inner shroud 58 for allowing relative axial translation between the outer and inner shrouds 56, 58.

Although the first hinge 62 is a separate component in the exemplary embodiment, the second hinge 64 is integrated with the outer shroud 56 and the cooperating slip joint 66. In this exemplary embodiment, the second hinge 64 includes a first leaf 64a which is positioned atop the outer surface of the inner shroud 58. The first leaf 64a has a tubular end pivotally joined to the complementary, interdigitated aft end 56b of the outer shroud 56 by a second hinge pin 64c. In this embodiment, the outer shroud aft end 56b defines the second leaf of the second hinge 64 in an integral combination therewith, with the second hinge pin 64c extending therethrough for defining the hinge.

The slip joint 66 includes a capture plate 66a fixedly joined at its forward end atop the inner shroud 58 by suitable spot welds 60 for example. The capture plate 66a is spaced in its aft part upwardly from the inner shroud 58 to define a slip groove 66b which receives the first leaf 64a of the second hinge 64 therein for allowing relative translation.

As show in FIGS. 3 and 4, as the divergent and outer flaps 38, 42 are adjusted between the open and closed positions, they undergo relative rotation A and translation B which is accommodated by corresponding relative rotation C and translation D between the outer and inner shrouds 56, 58. However, the outer and inner shrouds 56, 58 are otherwise joined to each other in constant configuration at any variable area position of the nozzle 32, and remain stationary against the substantial differential pressure forces acting as the exhaust flow 26 is discharged from the nozzle 32.

In the preferred embodiment illustrated in FIGS. 3 and 4, the outer shroud 56 is joined to the inner shroud 58 at the second hinge 64 at an acute included angle E for converging together the outer and inner shrouds 56, 58 for streamlining fluid flow thereover in a relatively sharp nozzle trailing edge. The outer and inner shrouds 56, 58 are preferably flat sheet metal plates formed of a suitable high temperature material such as that used for the primary and divergent flaps 36, 38 themselves. And the flat plate outer and inner shrouds 56, 58 are joined together at the second hinge 64 in a triangular configuration. Although the value of the included angle E varies slightly between the open and closed positions of the nozzle 32, the trailing edge fairing 54 nevertheless maintains the sharp, converging profile for reducing drag thereover.

As shown in FIG. 4, the inner shroud 58 includes an inner surface which is preferably disposed coextensively with an adjoining inner surface of the corresponding divergent flap 38 for providing a substantially smooth and continuous surface over which the exhaust flow 26 is discharged from the nozzle. Similarly, the outer shroud 56 includes an outer surface disposed coextensively with an adjacent outer surface of the outer flap 42, preferably in the nozzle closed position illustrated in FIG. 4, for providing an axially smooth and continuous flow surface over which the ambient air 24a flows during operation for reducing drag. The closed nozzle position illustrated in FIG. 4 is typically provided during cruise operation of the engine wherein it is desired to maximize efficiency by reducing aerodynamic drag.

In the exemplary embodiment illustrated in FIG. 5, the outer and inner shrouds 56, 58 are flat, with adjacent ones of the fairings 54 defined thereby being circumferentially adjoining in the nozzle closed position for providing a substantially circumferentially continuous nozzle outlet in the nozzle closed position having a discharge flow area designated $A_9$ as illustrated in FIG. 2. When the nozzle 32 is adjusted to its open position illustrated in FIG. 3, the individual divergent flaps 38 are moved radially outwardly, and therefore spread apart circumferentially so that the individual fairings 54 are circumferentially spaced apart from each other in the nozzle open position. The exhaust flow 26 is therefore allowed to leave the nozzle 32 additionally between the circumferential gaps between the fairings 54 uncovered in the nozzle open position.

Regardless of the relative relationship between the divergent and outer flaps 38, 42, over the range of nozzle position, the fairings 54 provide a reactively sharp trailing edge for streamlining both the discharge of the exhaust flow 26 from the nozzle 32 as well as the mixing therewith of the ambient air 24a during aircraft flight. A substantial reduction in drag is therefore obtained for improving efficiency of the nozzle 32 and eliminating the undesirable blunt trailing edge which otherwise existed in the conventional nozzle.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A fairing for aerodynamically streamlining a variable area exhaust nozzle divergent flap joined to an outer flap for allowing relative rotation and translation, comprising:

an outer shroud having forward and aft ends;

an inner shroud having forward and aft ends, with said forward end thereof being configured to fixedly join said divergent flap;

outer means for pivotally joining said outer shroud to said outer flap; and inner means for joining said outer shroud to said inner shroud for allowing relative rotation and translation therebetween.

2. A fairing according to claim 1 wherein said outer joining means comprise a first hinge at said outer shroud forward end for allowing relative rotation between said outer shroud and said outer flap.

3. A fairing according to claim 2 wherein said inner joining means comprise:

a second hinge at said outer shroud aft end for allowing said relative rotation between said outer and inner shrouds; and an axial slip joint joining said second hinge to said inner shroud for allowing said relative translation between said outer and inner shrouds.

4. A fairing according to claim 3 wherein said outer shroud is joined to said inner shroud at said second hinge at an acute angle for converging together said outer and inner shrouds and streamlining fluid flow thereover.

5. A fairing according to claim 4 wherein:

said second hinge includes a first leaf positioned atop said inner shroud, and pivotally joined to said outer shroud by a second hinge pin extending therethrough; and said slip joint includes a capture plate fixedly joined atop said inner shroud and spaced in part upwardly therefrom to define a slip groove receiving said first leaf therein for allowing relative translation therein.

6. A fairing according to claim 5 wherein said outer and inner shrouds are joined together at said second hinge in a triangular configuration.

7. A fairing according to claim 6 in combination with said divergent and outer flaps to define said exhaust nozzle, with said outer shroud being pivotally joined to an aft end of said outer flap at said first hinge, and said inner shroud being fixedly joined to an aft end of said divergent flap.

8. An exhaust nozzle according to claim 7 wherein:

said inner shroud includes an inner surface disposed coextensively with an adjacent inner surface of said divergent flap; and said outer shroud includes an outer surface disposed coextensively with an adjacent outer surface of said outer flap.

9. An exhaust nozzle according to claim 8 wherein said outer and inner shrouds are flat.

10. An exhaust nozzle according to claim 9 further comprising:

an exhaust casing;

a plurality of circumferentially spaced apart primary flaps pivotally joined to said exhaust casing;

a plurality of circumferentially spaced apart ones of said divergent flaps pivotally joined to respective ones of said primary flaps;

a plurality of links pivotally joined at opposite ends to said exhaust casing, and respective ones of said divergent flaps to define four-bar linkages to control kinematic motion of said primary and divergent flaps and effect a converging-diverging nozzle having variable flow area ranging between open and closed positions;

a plurality of circumferentially spaced apart ones of said outer flaps pivotally joined at opposite ends to said exhaust casing and respective ones of said divergent flaps;

means for actuating said primary flaps between said nozzle open and closed positions, and in turn varying said flow area of said divergent flaps; and a plurality of said fairings joined to respective pairs of said divergent and outer flaps, with said fairings being circumferentially adjoining in said nozzle closed position, and circumferentially spaced apart in said nozzle open position.

* * * * *